(12) United States Patent
Frick et al.

(10) Patent No.: US 8,745,337 B2
(45) Date of Patent: Jun. 3, 2014

(54) APPARATUS AND METHOD FOR CONTROLLING MEMORY OVERRUN

(75) Inventors: Lloyd K. Frick, Pepperall, MA (US); Eric Truebenbach, Sudbury, MA (US)

(73) Assignee: Teradyne, Inc., North Reading, MA (US)

( * ) Notice: Subject to any disclaimer, the term of this patent is extended or adjusted under 35 U.S.C. 154(b) by 1172 days.

(21) Appl. No.: 12/340,198

(22) Filed: Dec. 19, 2008

(65) Prior Publication Data

US 2009/0172310 A1    Jul. 2, 2009

Related U.S. Application Data

(60) Provisional application No. 61/018,409, filed on Dec. 31, 2007.

(51) Int. Cl.
*G06F 12/00* (2006.01)
*G06F 13/00* (2006.01)
*G06F 13/28* (2006.01)

(52) U.S. Cl.
USPC .................................. 711/154; 711/E12.001

(58) Field of Classification Search
CPC ............................. G06F 11/261; G06F 12/02
USPC ...................... 711/202, 154, E12.001
See application file for complete search history.

(56) References Cited

U.S. PATENT DOCUMENTS

| 4,926,322 | A | * | 5/1990 | Stimac et al. | 703/23 |
|---|---|---|---|---|---|
| 5,727,021 | A | | 3/1998 | Truebenbach | |
| 5,786,825 | A | * | 7/1998 | Cain et al. | 345/501 |
| 5,887,146 | A | | 3/1999 | Baxter et al. | |
| 5,946,247 | A | * | 8/1999 | Osawa et al. | 365/201 |
| 6,026,461 | A | | 2/2000 | Baxter et al. | |
| 6,122,756 | A | | 9/2000 | Baxter et al. | |
| 6,363,507 | B1 | | 3/2002 | Truebenbach et al. | |
| 6,507,920 | B1 | | 1/2003 | Truebenbach | |
| 6,519,690 | B1 | * | 2/2003 | Quimby | 711/202 |
| 6,563,352 | B1 | | 5/2003 | Gohel et al. | |
| 6,807,616 | B1 | * | 10/2004 | McGrath et al. | 711/206 |
| 6,894,505 | B2 | | 5/2005 | Gohel | |
| 7,343,279 | B2 | | 3/2008 | Truebenbach et al. | |
| 7,836,219 | B1 | * | 11/2010 | Mahmoud et al. | 710/16 |
| 2002/0124039 | A1 | * | 9/2002 | Inoue et al. | 708/670 |
| 2002/0144077 | A1 | * | 10/2002 | Andersson et al. | 711/203 |
| 2003/0033499 | A1 | * | 2/2003 | Chou | 711/220 |
| 2003/0061497 | A1 | * | 3/2003 | Zimmer | 713/189 |
| 2004/0268200 | A1 | * | 12/2004 | Mak et al. | 714/742 |
| 2006/0123279 | A1 | * | 6/2006 | Cardinell | 714/718 |
| 2007/0118713 | A1 | * | 5/2007 | Guterman et al. | 711/170 |
| 2007/0220241 | A1 | * | 9/2007 | Rothman et al. | 713/1 |
| 2008/0098272 | A1 | | 4/2008 | Fairbanks et al. | |

* cited by examiner

*Primary Examiner* — Sheng-Jen Tsai
(74) *Attorney, Agent, or Firm* — Wolf, Greenfield & Sacks, P.C.

(57) ABSTRACT

A memory address filter is configurable to emulate memory overrun performance of a legacy memory using an electronic memory of equal or greater capacity. The address filter includes a comparator configured to determine whether a target address is greater than a maximum legacy-address. Memory emulation at target address values greater than the maximum legacy-address value includes one or more of inhibiting the memory transaction; accomplishing the requested memory transaction at the maximum legacy-address value; and accomplishing the requested memory transaction at an address equivalent to the target address wrapped according to the maximum legacy-address value. In some embodiments, the address filter accepts one or more configuration parameters, such as memory depth, wrap-around, and overwrite enable.

16 Claims, 6 Drawing Sheets

APPARATUS AND METHOD FOR CONTROLLING MEMORY OVERRUN

RELATED APPLICATION

This application claims the benefit of U.S. Provisional Application No. 61/018,409, filed Dec. 31, 2007, the entire teachings of which are incorporated herein by reference.

FIELD OF THE INVENTION

The present invention relates generally to memory control and more specifically to memory control for emulating overrun behavior of another memory having equal or lesser capacity.

BACKGROUND OF THE INVENTION

Automatic test equipment (ATE) plays a role in the manufacture of semiconductor devices and circuit board assemblies. Manufacturers generally use automatic test equipment, or "testers," to verify the operation of devices during the manufacturing process. Such devices are referred to as a "device under test" (DUT) or a "unit under test" (UUT). Early detection of faults eliminates costs that would otherwise be incurred by processing defective devices, and thus reduces the overall cost of manufacturing. Manufacturers also use ATE to grade various specifications. Devices can be tested and binned according to different levels of performance in areas, such as speed. Devices can be labeled and sold according to their actual levels of performance.

In recent years, many types of legacy ATEs have been replaced with newer, higher-performance ATEs. Although such newer testers have many new features, many of the test programs that run on these newer testers have already been written, and depend on the performance characteristics of legacy ATEs. However, a newer ATE may not necessarily have the same performance characteristics as the legacy ATE. This can affect how existing programs are used with newer, or successor, ATE. For example, in older test instruments, memory was scarce. Older bus standards also made filling and retrieving memory time-consuming. So, while some test engineers would inadvertently overrun available memory, others would intentionally use undocumented features to loop around, overwrite, or otherwise re-use memory locations.

SUMMARY OF THE INVENTION

The present invention includes methods and apparatus for emulating behavior of a legacy test system. Beneficially, provisions are disclosed for newer, higher-performance ATEs to allow legacy programs running on the newer ATE to handle memory overrun situations according to a particular legacy system. Thus, legacy ATE programs can be used to write to electronic memories of newer, or successor, ATE that would tend to be larger than electronic memories of legacy ATE as if the memory were the size of the legacy memory and with a selectable memory overrun feature that mimics the legacy memory.

In one aspect, the process described herein relates to a process for transacting data with an addressable memory. The process includes receiving a target-address of a requested memory transaction. Whether the received target-address value is greater than a maximum legacy-address value is determined. A legacy-memory transaction is emulated in response to a determination that the received target-address value is greater than the maximum legacy-address value. A standard memory transaction is performed in response to a determination that the target-address value is not greater than the maximum legacy-address value. In some embodiments, legacy memory emulation is inhibits the requested memory transaction. Alternatively or addition, the legacy memory allows the requested memory transaction at the maximum-legacy address value. Alternatively or in addition, the legacy memory also allows the requested memory transaction at an overrun-adjusted address value determined by a wrapping of the target address with respect to the maximum-legacy address value. In some embodiments the legacy memory emulation is selectable from one or more of the above.

In another aspect, the device described herein relates to a memory-address filter including an input adapted to receive a target-address of a requested memory transaction and an output in communication with an addressable memory. The memory-address filter also includes a legacy-memory emulator in communication with the input and the output. The legacy-memory emulator emulates a legacy memory transaction in response to the received target-address value being greater than a maximum legacy-address value. Otherwise, the legacy-memory emulator performs a standard memory transaction. In some embodiments, the legacy-memory emulator comprises an inhibitor, inhibiting the requested memory transaction. Alternatively or in addition, the legacy-memory emulator comprises circuitry allowing the requested memory transaction at the maximum-legacy address value. Alternatively or in addition, the legacy-memory emulator comprises circuitry determining an overrun-adjusted address value according to a wrapping of the target address with respect to the maximum-legacy address value.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

A description of preferred embodiments of the invention follows.

DETAILED DESCRIPTION OF THE PREFERRED EMBODIMENTS

Figure 1:
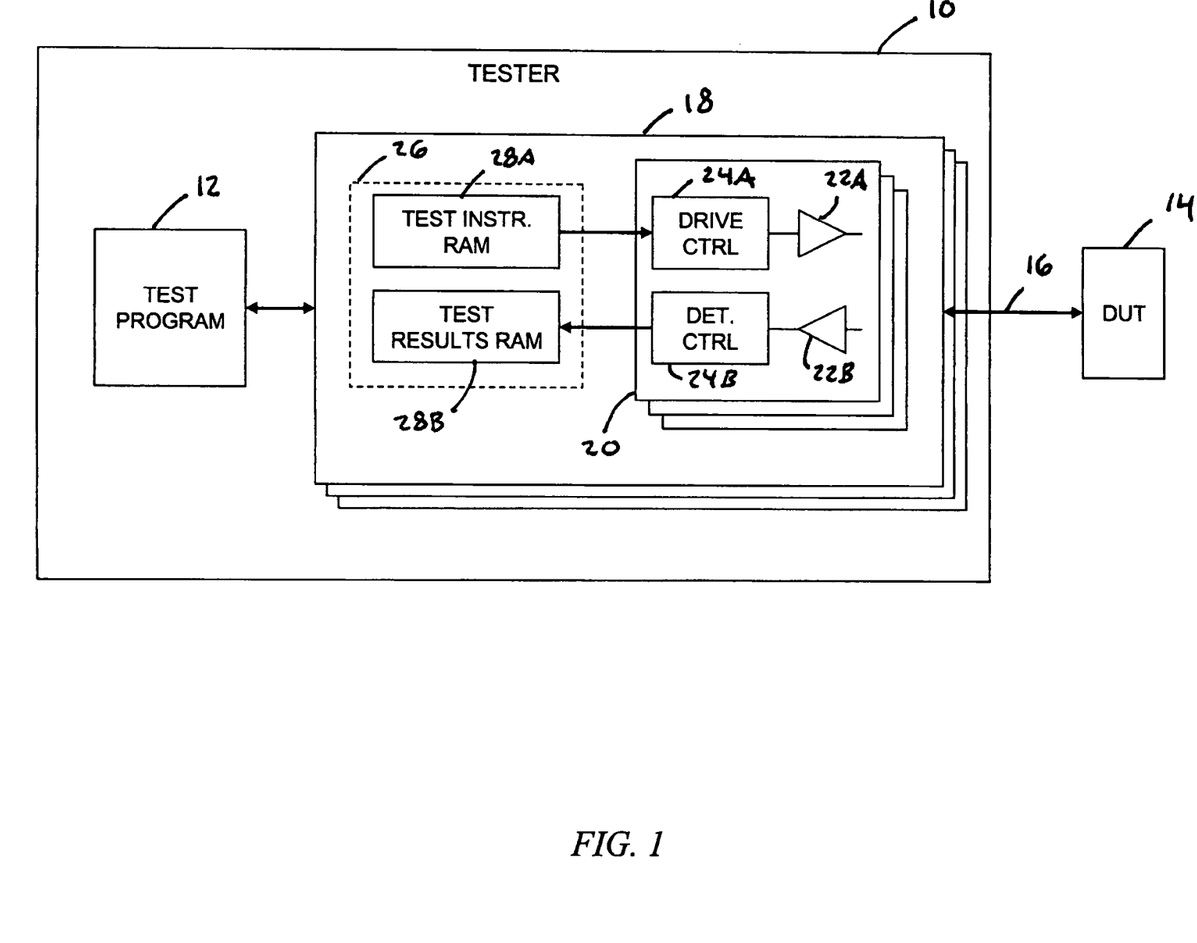
FIG. 1 is a block diagram of ATE components that may be used to produce a memory overrun handler that emulates memory overrun handling of a desired legacy memory.

Referring to FIG. 1, a block diagram of components that may be part of an ATE, referred to generally as a tester 10. The tester 10 may be a successor to legacy ATE, such as a newer model of existing ATE, or a completely new model of ATE. These components may be used in the tester 10 to emulate the memory access conditions of legacy ATE. These memory access conditions may include an assignable maximum legacy-address value, or memory depth, that can be equal to or lesser than the available memory capacity. The tester 10 may include a test program 12 that may, in turn, be designed for use with the legacy ATE (not shown). In the tester 10, the test program 12 is used to perform tests on signals received from a DUT 14 over a communication channel 16. A test instrument, such as the stored pattern test instrument 18 shown, may be executed through a combination of software, firmware, and or hardware. Alternatively or in addition, the test instrument 18 may be used for controlling the programming of test parameters on the tester 10.

During operation of the tester 10, test signals may be output from the tester 10 to the DUT 14 over the communications channel 16. The DUT 14 may respond by providing response signals over the communication channel 16. The response signals may be, e.g., produced by the DUT 14 in response to the test signals provided by the tester 10. Alternatively or in addition, the signals may be provided from the DUT 14 to the communication channel 16 that are independent of the test signals. Such activity over the communication channel 16 can be accomplished by one or more channel cards 20. Each channel card 20 may include one or more of a driver 22A with associated drive control logic 24A and receiver, or detector 22B associated with detector control logic 24B. There may be one or more detectors 22B per channel 16 (only one channel 16 is shown in FIG. 1).

The detector 22B may include one or more comparators and/or other types of hardware to implement a measurement function. At least part of the detector control logic 24B may also be implemented in software. The detector 22B is in electrical communication with the communications channel 16, and is configured to receive signals from the communication channel 16, to compare those signals to one or more thresholds, and to provide comparison results to the test program 12. There, the comparison results are evaluated in order to determine, e.g., if the DUT 14 has passed or failed a particular test. One or more of the channel cards 20 are in communication with a memory 26. In some embodiments, the memory 26 includes one or more of a test instruction memory 28A and a test result memory 28B. One or more of the memories 28A, 28B may be a random access memory (RAM).

Figure 2:
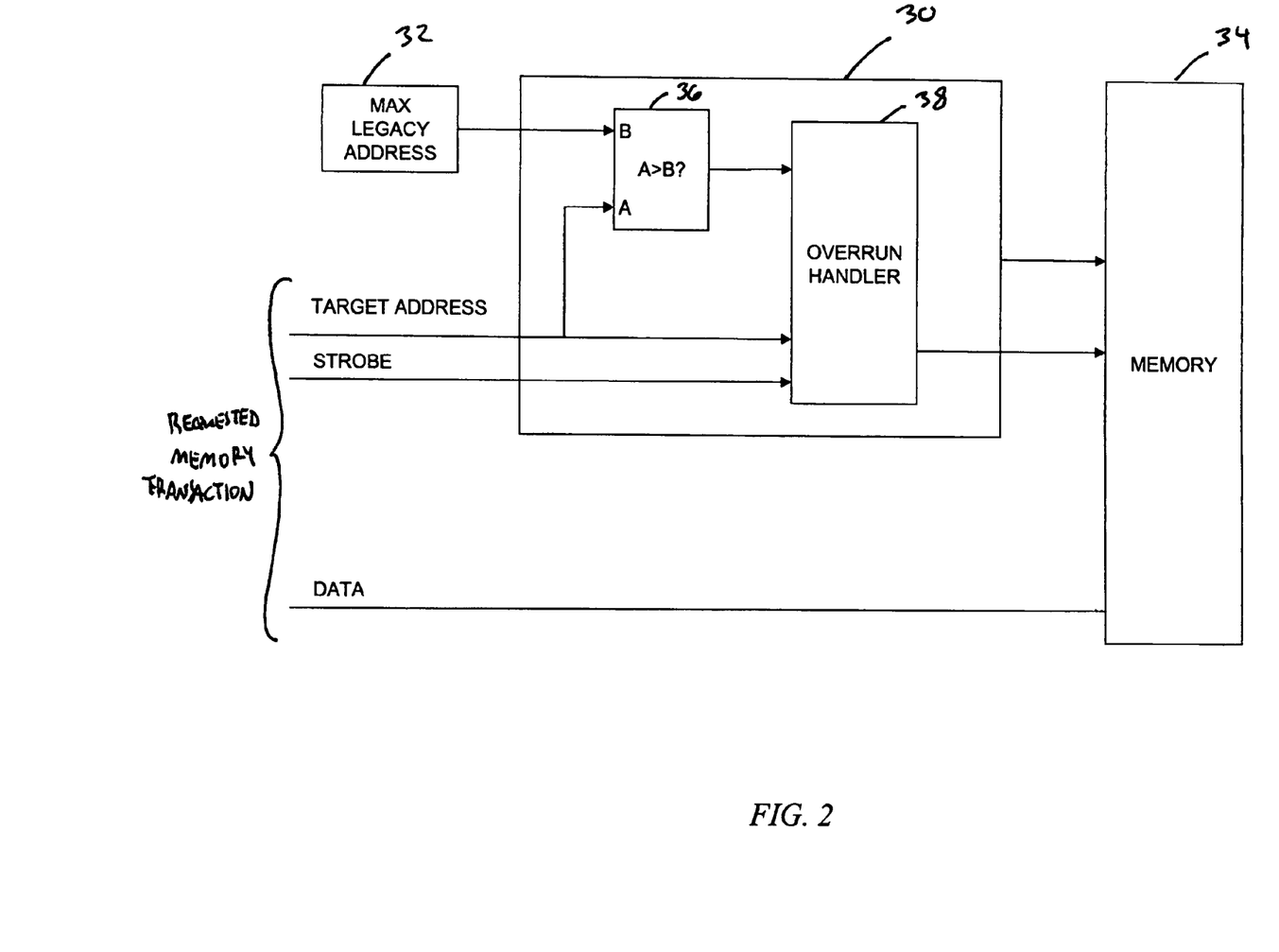
FIG. 2 is a functional block diagram of exemplary memory overrun device according to the present invention.

Referring next to FIG. 2, an exemplary address filter 30 is illustrated. The address filter 30 receives a maximum legacy-address value 32, a target address value associated with a requested memory transaction. The transaction may include a write operation in which DATA is written into the addressable memory 34 at a respective address. The writing may be controlled by the STROBE. Alternatively or in addition, the transaction may include a read operation in which DATA is readable from the addressable memory 34, from a respective ADDRESS.

In some embodiments configured to support memory write transactions, the address filter 30 also receives a strobe. The address filter 30 is in further communication with an addressable memory 34. Transactions with the memory 34 are accomplished according to a filtered address provided by the address filter 30. In some embodiments, the address filter 30 includes a comparison element 36 configured to determine whether the target address value is greater than the maximum legacy-address value 32. The comparison element 36 provides an output indicative of the comparison. For example, the comparison element 36 may provide a logical true or false value (e.g., a '1' or a '0') according to the comparison test.

In some embodiments, the address filter 30 further includes a memory overrun handler 38. The overrun handler 38 receives the output of the comparison element 36. Upon a determination that the target address value is greater than the maximum legacy-address value, the overrun handler 38 emulates a response of a legacy memory. The capacity of the addressable memory 34 is greater than or equal to the capacity of the legacy memory. In some embodiments, such emulation includes inhibiting the requested memory transaction. Such inhibition can be accomplished by inhibiting the strobe signal. Alternatively or in addition, such emulation includes transacting with a memory address equivalent to the maximum legacy-address value. Thus, subsequent transactions at target addresses also above the maximum legacy-address would be read from or written to, as the case may be, the same memory address, equivalent to the maximum legacy-address value. Alternatively or in addition, the overrun handler 38 filters or otherwise alters the memory address to a value equivalent to a memory address determined by wrapping the target address value according to the maximum legacy-address value. For example, a transaction with the next address after the maximum legacy-address value would be accomplished at a filtered address equivalent to the first memory address. In some embodiments, the respective address may be subject to alteration by the memory overrun handler 38. Alternatively or in addition, the STROBE may also be subject to alteration by the memory overrun handler 38.

Figure 3:
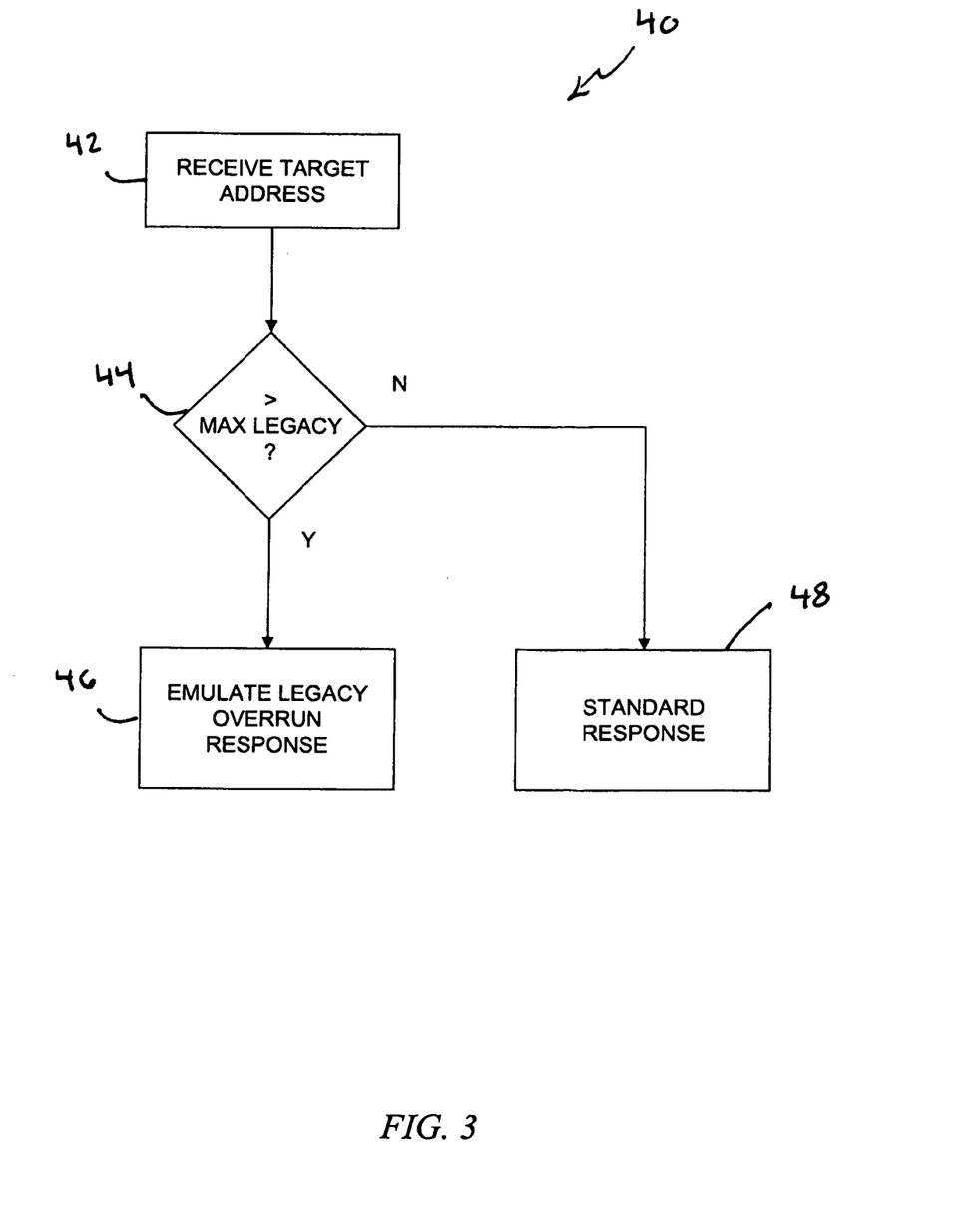
FIG. 3 is a flow diagram of an exemplary process for emulating a legacy overrun response according to the present invention.

FIG. 3 illustrates an exemplary flow diagram of a high level memory emulation process 40 according to the present invention. A target address is first received at 42. The target address may be intercepted between circuitry requesting a memory transaction and the addressable memory 34 (FIG. 2). Next, a determination is made whether the received target address is greater than the maximum legacy-address value at 44. In alternative embodiment, a comparison can be determined whether the received target address is less than or equal to the maximum legacy-address value. In response to a determination that the received target address is greater than the maximum legacy-address value, a legacy response with respect to the requested memory transaction is accomplished at 46. In response to a determination that the received target address is not greater than the maximum legacy-address value, a standard memory transaction at the requested target address value is accomplished at 48. Whether emulating the legacy overrun response or implementing a standard response, the memory transaction may include a read operation during which data is read from the addressable memory, a write operation during which date is written into the addressable memory, and a combination or read and write operations.

Figure 4:
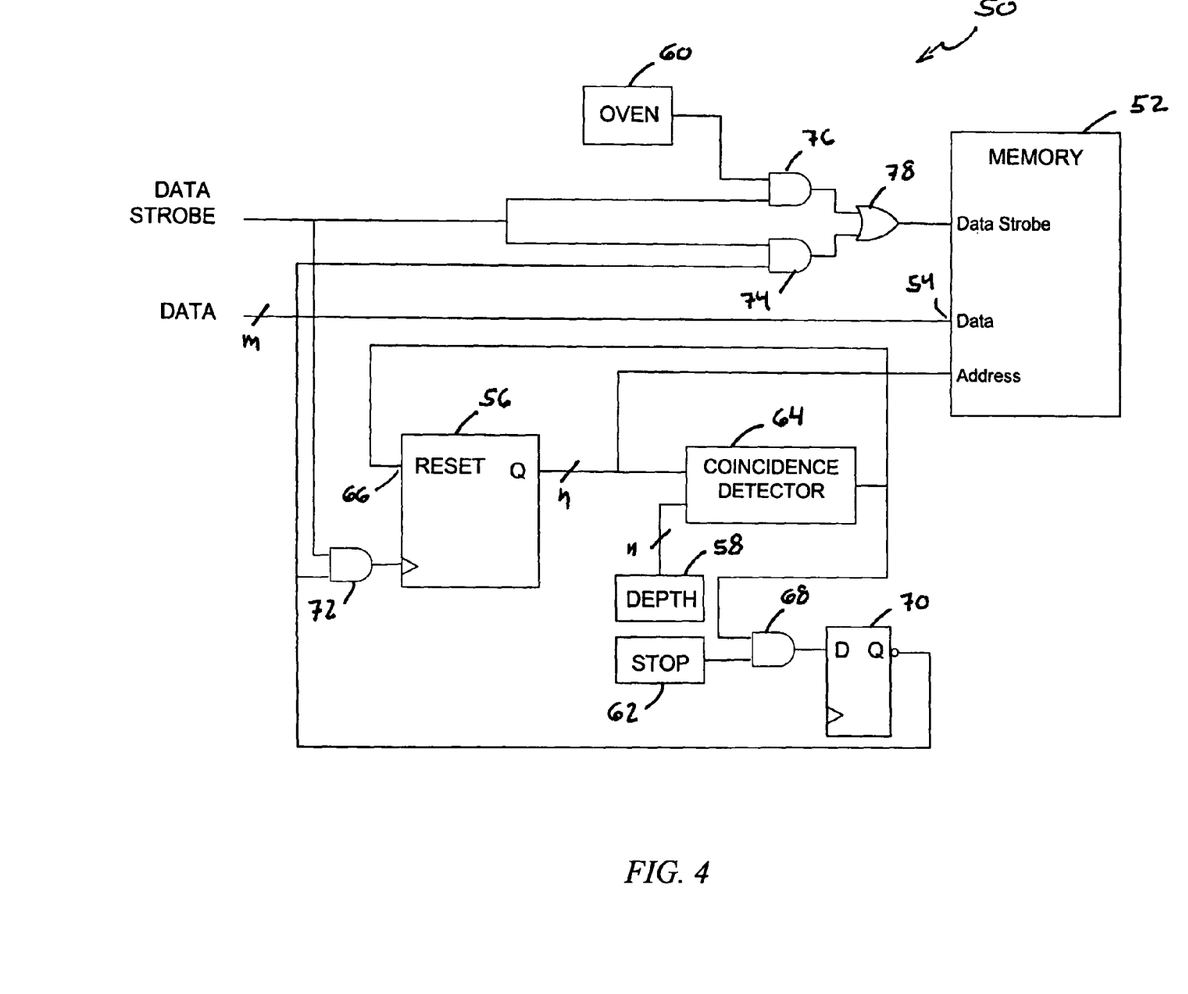
FIG. 4 is a schematic diagram of one embodiment of memory overrun circuitry according to the present invention.

An example of a circuit that may be used to emulate memory overrun of legacy ATE, which may be incorporated into the ATE, is shown in the schematic of FIG. 4. For example, the circuit may be part of the ATE 10 (FIG. 1) described above. Referring to the figure, an exemplary memory overrun control circuit 50 is illustrated. In the exemplary embodiment, the memory overrun control circuit 50 is configurable, allowing an addressable electronic memory 52 having storage capacity not less than a legacy electronic memory to emulate the legacy memory in its capacity and its handling of overrun scenarios in which data is written into the memory 52 after the last valid address has been written to. The particular example related to an application in which data is written to memory in a sequential manner, as may be the case in a data logger.

The memory 52 includes a data port 54. The data port 54 may receive data to be written into the memory during a write transaction, or provide data to be read from the memory during a read transaction. The memory 52 also receives a data strobe and an address value indicative of a memory address into which the received data should be written upon receipt of the data strobe. The data port 54 includes m data lines for receiving m bits of data in parallel. For example, m=8 for an 8-bit data word. The address can also include n address lines for receiving n bits of address in parallel. For example, n=8 for an 8-bit address, capable of addressing up to 256 separate memory locations.

In the exemplary embodiment, a resettable address counter 56 is configured to maintain a count value indicative of sequential memory addresses when incremented. The address counter 56 can be reset to an initial value indicative of a first memory location (e.g., 0000 0000). Although the address of the first memory location in this example corresponds to zero, the sequential memory addresses need not start or otherwise include zero. Generally, the sequential memory addresses may start at a non-zero, minimum address and extend to a maximum address, without any restriction as to where in physical memory the span of sequential memory addresses actually resides.

The circuit 50 includes a first register 58 storing a maximum writable address (DEPTH) of the memory. The DEPTH register 58 is configured to store an n-bit memory address word value. The circuit includes a second register 60 storing a value (OVEN) indicative of whether a value written to the maximum writable address is overwritten upon subsequent data strobes. The circuit 50 also includes a third register 62 storing a value (STOP) indicative of whether further memory writes are disabled after the maximum writable address has been written to. In the exemplary embodiment, values stored in these three registers: DEPTH 58, OVEN 60, and STOP 62, determine memory overrun performance of the electronic memory 52, the performance being configurable by the particular values chosen to emulate a particular legacy memory device.

The circuit 50 includes a coincidence detector 64 receiving at its inputs output from the address counter 56 and the value stored in the DEPTH register 58. The coincidence detector 64 provides a TRUE value upon the two input values being equal, indicating that the addressed memory location is the last available memory location, as would be the case for an actual legacy memory. The coincidence detector 64 can be provided using multiple exclusive OR (XOR) gates, one for each address line, combined through additional gates to provide a single output value according to the logic just described. An output of the coincidence detector 64 is fed into a reset terminal 66 of the address counter 56, causing the counter 56 to be reset to the initial value (e.g., 0000 0000). The output of the coincidence detector 64 is also input to one input of a first AND gate 68. The other input of the first AND gate 68 is driven by the value stored in the STOP register 62. An output of the first AND gate 68 drives a D input of a D-type flip-flop 70. A second AND gate 72 is driven by an inverted output of the D-type flip-flop 70 and the data strobe. An output of the second AND gate 72 is coupled to a clock input of the address counter 56. The data strobe input drives one input of each of third and fourth AND gates 74, 76, the outputs of which are combined in an OR gate 78. The output of the OR gate 78 is coupled to a data strobe input of the electronic memory 52. A second input of the third AND gate 74 is driven by the inverted output of the D-type flip-flop 70. A second input of the fourth AND gate 76 is driven by a value stored in the OVEN register 60.

While an output address value of the address counter 56 is less than the maximum address value stored in the DEPTH register 58, the input to the D-type flip-flop 70 is FALSE, regardless of the value stored in the STOP register 62. Thus, the inverted output of the D-type flip-flop 70 is TRUE. The output of the second AND gate 72 is thus controlled by the data strobe, allowing the data strobe to clock the address counter 56, incrementing the address value upon each data strobe. The current address value output of the address counter 56 is coupled to the address input of the electronic memory 52. The TRUE output of the D-type flip-flop 70 is also provided to the third AND gate 74, such that the output of the third AND gate 74 is also controlled by the data strobe. Thus, the data strobe is applied to the data strobe input of the electronic memory 52, writing data provided at the data port 54 into the specified addressed location of the electronic memory 52.

With each data strobe, the address is incremented, and data written into the next memory location, until the memory address coincides with the maximum address value stored in the DEPTH register 58. When these values are equal, the coincidence detector 64 provides a TRUE output that resets the address counter 56 and applies the value stored in the STOP register 62 to the input of the D-type flip-flop 70. The STOP value is clocked to the inverted output of the D-type flip-flop 70, which controls application of the data strobe to the clock input of the address counter 56 and to the data strobe input of the electronic memory 52.

If the value stored in the STOP register 62 is TRUE, the inverted output will be FALSE. Thus, a STOP value of TRUE disables the clock input to the address counter 56, and the data strobe input to the electronic memory 52, unless the overwrite control value stored in the OVEN register 60 is TRUE. If the overwrite control value (OVEN) is TRUE, the data strobe will be applied to the data strobe input of the electronic memory 52 causing data at the data port to be overwritten into the last memory location (i.e., memory location stored in the DEPTH register indicative of a maximum storage location of the legacy memory). If the OVEN value is FALSE, the data strobe will not be applied to the data strobe input of the electronic memory 52 prohibiting data at the data port from being written into the electronic memory 52. In some embodiments, data is read from the same last address for all read addresses above the last address. Alternatively or in addition, an attempted read from a memory address above the last address is prohibited (e.g., resulting in an error message), the particular performance selected dependent upon the particular legacy memory being emulated.

If the value stored in the STOP register 62 is FALSE, the inverted output of the D-type flip-flop 70 will be TRUE regardless of detection of a coincidence by the coincidence detector 64. A STOP value of FALSE enables the clock input to the address counter 56, and the data strobe into the electronic memory 52, regardless of any overwrite control value stored in the OVEN register. Thus, a STOP value of FALSE emulates legacy overrun control referred to as "wrap around." When the maximum DEPTH value is reached, the address counter is reset to the beginning and the data strobe controls the writing of data into the addressed memory location by the electronic memory, incrementing again and overwriting previously written memory values in an incremental fashion.

The table below summarizes the different emulations of memory overrun control possible with the exemplary circuit providing DEPTH, STOP, and OVEN. The tabulated results apply after the address counter output exceeds DEPTH value. While the address is less than DEPTH, data is simply written to the address location upon the next data strobe.

TABLE

Memory Overrun Control Configurations.

| STOP | OVEN | Result |
|---|---|---|
| FALSE | FALSE | Wrap around |
| FALSE | TRUE | Wrap around |
| TRUE | FALSE | Stop writes at last memory location |
| TRUE | TRUE | Last memory location overwritten |

The memory write control circuitry may be implemented using one or more processing devices. Examples of processing devices include, but are not limited to, a microprocessor, a microcontroller, programmable logic (e.g., a field-programmable gate array), actual gates, and/or combination(s) thereof. Alternatively or in addition, one or more features of the memory write control functionality of the exemplary memory write control circuitry can be accomplished using instructions executed in a computer program.

Figure 5:
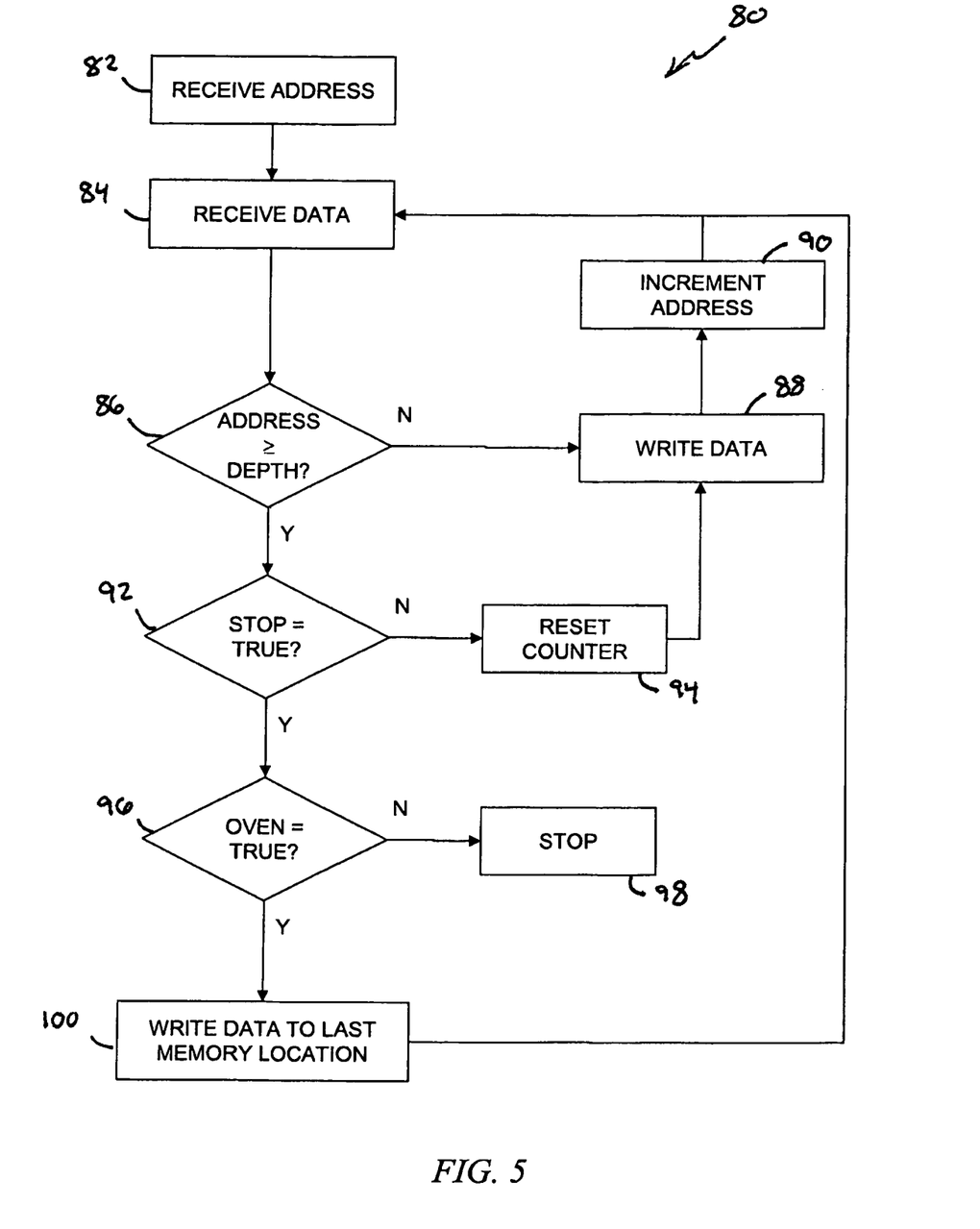
FIG. 5 is a flow diagram of an exemplary process for selectively controlling memory overrun according to the present invention.

Referring to an exemplary legacy memory emulation process 80 of FIG. 5, an address is received at step 82 and a data word is received at step 84. The address is compared to a depth value at step 86, indicative of a maximum legacy memory storage location. If the address is less than the depth value, the data word is written into electronic memory at step 88 and the address counter incremented at step 90. The process flow returns to step 84 for a subsequently received data word.

If the incremented address value is equal to or greater than the depth value at step 86, a logical value of a STOP value is determined at step 92. If the logical STOP value is false, indicating wrap-around emulation, the address counter is reset at step 94, data is written to the reset address value at step 88, the address counter is incremented at step 90, and process flow returns to step 84 for another subsequently received data word. If, however, the logical STOP value is true, a logical overwrite enable value (OVEN) is determined at step 96.

If the logical OVEN value is false, further writes to the electronic memory are disabled, and the process stops at step 98. This emulates performance of a legacy memory that terminates further writes upon reaching a maximum storage location. If, however, the logical OVEN value is true, the data is written to the memory address indicative of the maximum storage location at step 100. Process flow returns to step 84, with the maximum storage location being overwritten with each received data word. The address depth remains greater than the maximum storage location, and the logical STOP and OVEN values have not changed. This emulates performance of a legacy memory that overwrites the maximum storage location for all data writes addressed to memory address values above the maximum address.

Thus, a memory controller storing such configuration parameters is able to emulate a preferred legacy memory overrun performance. Such legacy performance includes wraparound, in which memory addresses above the maximum legacy address are sequentially overwritten into the same memory space, beginning with a first memory location. The memory controller is also able to emulate a legacy memory controller that overwrites a maximum memory address for addresses greater than the maximum address, and a legacy memory controller that simply inhibits further memory writes for addresses greater than the maximum address.

Figure 6:
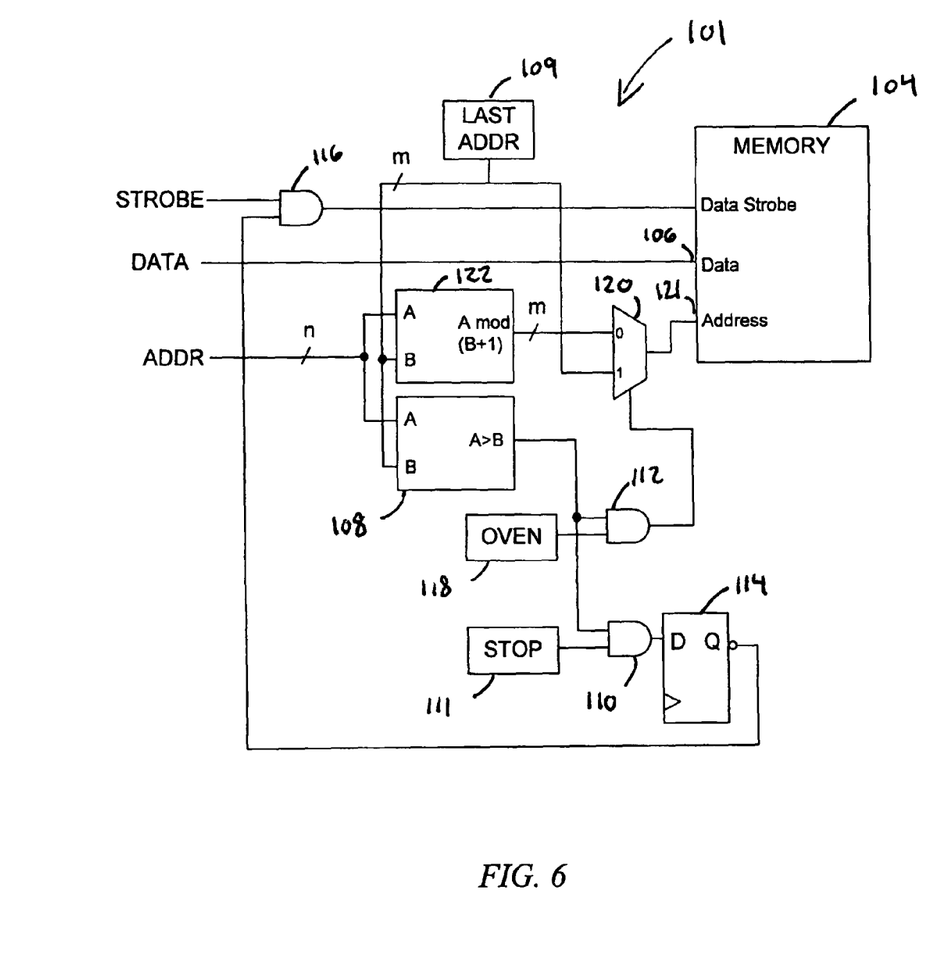
FIG. 6 is a schematic diagram of an alternative embodiment of memory overrun circuitry according to the present invention.

Referring next to FIG. 6, an exemplary address filter circuit 101 is provided to emulate at least three different behaviors. The circuit includes an addressable electronic memory 104, receiving data at a data input 106. The circuit 101 also includes a comparator 108 receiving a target address value of a requested memory transaction. The comparator 108 also receives a "last address" value from a last address storage register 109. The last value is indicative of a maximum last address value. The comparator 108 compares the two input values, providing an output indicative of the target address being greater than the last address value. The output value is input at one leg of each of a first and second AND gates 110, 112.

A first mode control input value (i.e., STOP) can be stored in a STOP value register 111. The STOP value can be applied to a second input of the first AND gate 110, such that when the stop value is enabled (e.g., a logical 1), and the output of the comparator is also a true value (e.g., a logical 1), the output of the first AND gate 110 is also a true value (e.g., a logical 1). The output of the first AND gate 110 is input to a D-type latch 114. An inverted "Q" latch output is false (e.g., a logical 0) for a true input value.

A memory access strobe associated with data write request is provided together with the inverted Q output at respective inputs to a third AND gate 116. Thus, the strobe is active, as usual, unless the STOP value is enabled and the target address is greater than the last address value. In that instance, the STROBE input is essentially blocked, emulating a legacy memory that blocks memory writes in an overrun situation.

A second mode control input value (i.e., OVEN) is stored in an overwrite-enabled register 118. The OVEN value is provided at a second input of the second AND gate 112. When the OVEN value is enabled (e.g., a logical 1), and the output of the comparator 108 is also a true value, the output of the second AND gate 112 is a true value (e.g., a logical 1). The second AND gate 112 output is input to a selection input of a two-channel multiplexer 120. A true value input selects a second channel of the two-channel multiplexer 120, coupling the memory address input 121 to the second channel, providing the last address value obtained from the last address value register 109. Thus, all read transactions occurring at target address values above the last address (i.e., in overrun situation) will be read from the memory 104 at the same last address value. If the write enable is not disabled as described above (e.g., STOP not equal to 1), then all write transactions occurring at target address values above the last address value will also be over written into memory 104 at the same last address value.

For situations in which the OVEN value is zero, the first multiplexer channel will be selected, regardless as to whether the target address value is greater than the last address value or not. The address value provided at the first multiplexer input, however, is obtained from a modulo-combiner 122, forming a modulo operation of the target address and the last address value. The effect will be to effectively wrap the target address value about the last address. The next highest address after the last address value is the first address—wrapped.

As described above, a test program designed for legacy ATE may expect a certain memory capacity, with special provisions for handling memory overrun (i.e., writes to memory beyond the available capacity of a memory.)

Although the exemplary embodiments described herein refer to emulating a legacy memory, the present invention is by no means limited to legacy memory devices. For example, the systems and procedures described herein can be used to emulate any memory, not necessary a so-called legacy memory. Further, the system and procedures described herein can be used more generally to control overrun handling of a memory without regard to any other memory device.

Although the processes and systems described herein by way of exemplary embodiment may be suggestive of hardware implementations, or software implementations, it is understood that the particular functionality may be implemented entirely in hardware, entirely in software, or in combinations of both hardware and software.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for transacting data with an addressable memory, comprising:
   receiving a target address value of a requested memory transaction;
   determining whether the target address value is greater than a maximum legacy address value;
   in response to a determination that the target address value is greater than the maximum legacy address value, emulating a legacy-memory transaction by performing an emulation of a selectable type, wherein the emulation of the selectable type is selectable from between: (a) inhibiting the requested memory transaction; and (b) allowing the requested memory transaction at the maximum legacy address value; and
   in response to a determination that the target address value is not greater than the maximum legacy address value, executing a standard memory transaction.

2. The method of claim 1, wherein the emulation of the selectable type comprises inhibiting the requested memory transaction.

3. The method of claim 1, wherein the emulation of the selectable type comprises allowing the requested memory transaction at the maximum legacy address value.

4. The method of claim 1, wherein the requested memory transaction comprises reading data from the addressable memory.

5. The method of claim 1, wherein the requested memory transaction comprises writing data to the addressable memory.

6. The method of claim 1, wherein the maximum legacy address value is selectable.

7. A memory-address filter, comprising:
   an input adapted to receive a target address value of a requested memory transaction;
   an output in communication with an addressable memory; and
   a legacy-memory emulator in communication with the input and the output, the legacy-memory emulator configured to:
      emulate a legacy memory transaction in response to the target address value being greater than a maximum legacy address value, and
      perform a standard memory transaction if the target address value is not greater than the maximum legacy address value
   wherein the legacy-memory emulator comprises a mode-selector, and wherein the legacy memory transaction is of a type selectable, using the mode-selector, between: (a) inhibiting the requested memory transaction; and (b) allowing the requested memory transaction at the maximum legacy address value.

8. The memory-address filter of claim 7, wherein the legacy-memory emulator comprises a comparator circuit determining whether the target address value is greater than the maximum legacy address value.

9. The memory-address filter of claim 7, further comprising a storage element configured to store the maximum legacy address value.

10. The memory-address filter of claim 7, wherein the mode selector comprises at least one mode selection register storing at least one of a STOP value and a memory overrun enable value.

11. The memory-address filter of claim 7, wherein the legacy memory emulator comprises a strobe inhibitor, configured to inhibit a requested write memory transaction in response to the received target address value being greater than the maximum legacy address value.

12. A memory-address filter, comprising:
   means for receiving a target address value of a requested memory transaction;
   means for determining whether the target address value is greater than a maximum legacy address value;
   means for, in response to a determination that the target address value is greater than the maximum legacy address value, performing a legacy memory transaction of a type selectable between: (a) inhibiting the requested memory transaction; and (b) allowing the requested memory transaction at the maximum legacy address value; and
   means for providing the target address value to an addressable memory, in response to a determination that the target address value is not greater than the maximum legacy address value.

13. A system comprising:
   automatic test equipment configured to couple to a device under test (DUT) and to execute a test program to perform a test of the DUT, the automatic test equipment comprising the memory-address filter of claim 7.

14. An automatic test system, comprising:
   automatic test equipment (ATE) configured to couple to a device under test (DUT) and to execute a test program to perform a test of the DUT, the ATE comprising:
      an input adapted to receive a target ATE memory address value of a requested ATE memory transaction, the target ATE memory address value identifying a target ATE memory address value of an addressable memory of the ATE;
      an output in communication with the, addressable memory; and
      a legacy-memory emulator in communication with the input of the ATE and the output of the ATE, the legacy-memory emulator configured to:
         emulate a legacy ATE memory transaction in response to the target ATE memory address value being greater than a maximum ATE legacy address value, and
         perform a standard ATE memory transaction if the target ATE memory address value of the memory of the ATE is not greater than the maximum ATE legacy address value,
      wherein the legacy-memory emulator comprises a mode-selector, and wherein the legacy ATE memory transaction is of a type selectable, using the mode-selector, from among a plurality of types of legacy ATE memory transactions.

15. The automatic test system of claim 14, wherein the legacy ATE memory transaction is of a type selectable between: (a) inhibiting the requested ATE memory transaction; (b) allowing the requested ATE memory transaction at the maximum ATE legacy address value; and (c) allowing the requested ATE memory transaction at an overrun-adjusted ATE address value determined by a wrapping of the target ATE address value with respect to the maximum ATE legacy address value.

16. The automatic test system of claim 15, wherein the legacy ATE memory transaction is of a type selectable between: (a) inhibiting the requested ATE memory transaction; and (b) allowing the requested ATE memory transaction at the maximum ATE legacy address value.

\* \* \* \* \*